United States Patent [19]
Hill

[11] Patent Number: 5,409,280
[45] Date of Patent: Apr. 25, 1995

[54] PIPE CLAMP

[75] Inventor: Craig I. J. Hill, Shenzhen, China

[73] Assignee: Weatherford/Lamb, Inc., Houston, Tex.

[21] Appl. No.: 116,370

[22] Filed: Sep. 3, 1993

[51] Int. Cl.⁶ .............................................. B65G 7/12
[52] U.S. Cl. ...................................... 294/16; 294/116
[58] Field of Search ............ 294/16, 104, 106, 110.1, 294/113, 115–117, 88

[56] References Cited

U.S. PATENT DOCUMENTS

| | | | |
|---|---|---|---|
| 763,338 | 6/1904 | Baker | 294/16 |
| 1,320,688 | 11/1919 | Healy . | |
| 1,550,496 | 8/1925 | Boughner . | |
| 2,363,392 | 11/1944 | Buquor | 294/116 |
| 2,378,570 | 6/1945 | Mitchell | 294/117 X |
| 2,597,760 | 5/1952 | Strahm | 294/16 |
| 2,623,770 | 12/1952 | Eby | 294/116 X |
| 2,915,333 | 12/1959 | Koenig et al. | 294/16 X |
| 2,989,337 | 6/1961 | Pispisa | 294/116 X |
| 3,068,036 | 12/1962 | Doty | 294/104 |
| 3,126,222 | 3/1964 | Stuart | 294/16 |
| 3,199,161 | 8/1965 | Hamilton | 24/132 |
| 3,318,630 | 5/1967 | Bryant | 294/116 X |
| 3,451,711 | 6/1969 | Carpenter | 294/113 |
| 3,522,966 | 8/1970 | Wood | 294/110.1 |
| 3,627,372 | 12/1971 | Carpenter et al. | 294/88 |
| 3,637,011 | 1/1972 | Wheeler | 166/77.5 |
| 3,756,645 | 9/1973 | Hienemann | 294/16 X |
| 3,945,676 | 3/1976 | Asamoto | 294/88 |
| 4,098,532 | 7/1978 | Phillips | 294/75 |
| 4,304,433 | 12/1981 | Langowski | 294/106 |
| 4,332,411 | 6/1982 | Ellzey | 294/104 |
| 4,382,591 | 5/1983 | Minnis et al. | 269/156 |
| 4,545,722 | 10/1985 | Cutkosky et al. | 414/730 |
| 4,647,098 | 3/1987 | Hoyer et al. | 294/101 |
| 4,716,811 | 1/1988 | Johnson | 294/115 X |
| 4,743,056 | 5/1988 | Oliason | 294/116 |

FOREIGN PATENT DOCUMENTS

| | | | |
|---|---|---|---|
| 13778 | 1/1913 | United Kingdom | 294/116 |
| 1122505 | 11/1984 | U.S.S.R. | 294/116 |

OTHER PUBLICATIONS

"Pipe Grabs Beam Clamps," Clamp–Co, Incorporated; Bulletin 1-91; prior to 1992.
"Lifting Tongs," McMaster-Carr, prior to 1992.

Primary Examiner—Johnny D. Cherry
Attorney, Agent, or Firm—Guy McClung

[57] ABSTRACT

A pipe clamp for clamping to a pipe to facilitate lifting and movement of the pipe. The pipe clamp in one aspect has a body member with one fixed arm and with one arm movably connected thereto; or with two arms movably connected to the body member. Preferably, when there are two movable arms, they are urged outwardly by springs biased against the arms and the body member. Gripping elements are provided on the arms and on the body member for contacting the pipe and gripping it. A cylinder movably mounted in a channel in the body member is disposed for movement when a lifting force is applied to a lift member movably connected to the cylinder. As the cylinder moves in response to the lifting force, cam surfaces thereon are forced against rollers movably mounted in plungers, moving the plungers outwardly from the cylinder to contact a portion of the arms thereby forcing the arms toward each other so that a pipe disposed therebetween is clamped between the arms. A releasable locking mechanism inhibits unwanted escape of the pipe from the clamp; and in one aspect, inhibits the application of excessive force to the pipe.

13 Claims, 3 Drawing Sheets

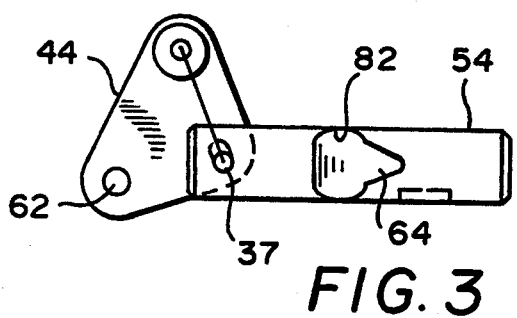
FIG. 3
FIG. 4A
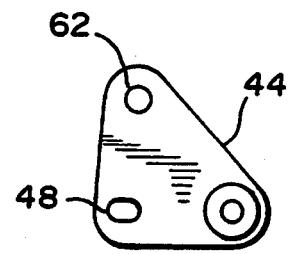
FIG. 5A
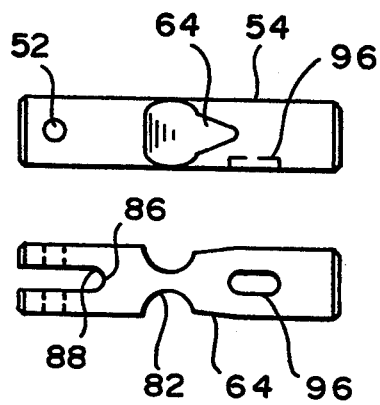
FIG. 4B
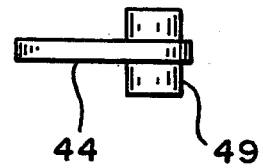
FIG. 5B
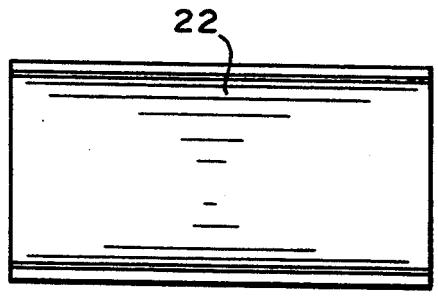
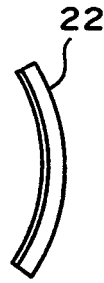
FIG. 6A    FIG. 6B
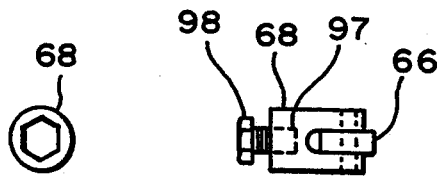
FIG. 7C    FIG. 7D    FIG. 7A
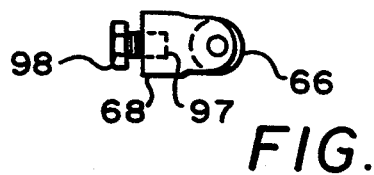
FIG. 7B

PIPE CLAMP

BACKGROUND OF THE INVENTION

1. Field of the Invention

This invention is directed to pipe clamps; and in one aspect to a pipe clamp which is releasably lockable about a pipe.

2. Description of Related Art

The prior art discloses a variety of clamps for clamping pipe.

U.S. Pat. No. 4,743,056 discloses lifting tongs which are used in lifting heavy sections of cylindrical pipe. The lifting tongs have first and second opposing jaws and first and second mounting plates which are rigidly joined to the first and second jaws. The mounting plates are arranged in mutually overlapping parallel disposition in spaced separation from each other. First and second crank or cam levers are interposed in the gap between the mounting plates, and are rotatably secured relative thereto. The crank levers have cam lobes which act against corresponding cam surfaces on the jaws to force the jaws together with about a 4 to 1 mechanical advantage when the tongs are lifted.

U.S. Pat. No. 4,716,811 discloses a gripping apparatus for restraining the gun barrel on an armored vehicle which has a pair of gripping jaws pivotally supported within a housing and connected by a first pair of toggle links to a movable carriage within the housing such that the jaws are opened and closed upon movement of the carriage, a pair of locking members slidably carried on the carriage and adapted to enter apertures in the sides of the housing to lock the carriage at a predetermined location at which the jaws are closed and the toggle links of the first pair are in substantially a straight line relationship, and a second pair of toggle links connected to the locking member and to an actuator rod so as to enable the toggle links of the second pair to assume an over-center position upon the locking members being received in the apertures for positively locking the carriage in the predetermined location.

U.S. Pat. No. 4,545,722 discloses a flexible gripper for industrial robots through the use of articulated ball joint linkages and an industrial brake. The gripper can orient itself to an object and adapt to irregular surfaces while engaging the object. The gripper matches the orientation of the grasped part. With the object so engaged, the gripper is locked rigidly so that the orientation of the part is preserved as it is manipulated by the flexible gripper and its associated robot.

U.S. Pat. No. 4,647,098 discloses a hoist clamp with a coupling eye which has a gimbal-type connection by means of the shafts to clamp operating crank. When a diagonal pull is exerted, the neck of the coupling eye engages against a bracing point which is sufficiently high above the shaft to ensure that the lever action provides extra clamping force between the clamps. When the coupling eye swings about the shaft, the coupling eye engages against the upper edges of the casing, its edges curving outwards, so that additional clamping force is also obtained when the pull exerted is diagonal. Said additional clamping force is only marginally affected by the load held in the load aperture.

U.S. Pat. No. 3,451,711 discloses a set of pipe tongs for lifting and handling heavy sections of pipe, for example, installing the pipe in a narrow open trench or ditch. The tongs include means for automatically releasing the pipe after it is placed in the trench to facilitate withdrawal of the tongs. Upward force on arm members brings them into Contact with tong members, forcing the tong members toward each other to clamp a pipe therebetween.

There has long been a need for an effective pipe clamp which does not injure the pipe and from which pipe does not accidentally fall during lifting.

SUMMARY OF THE PRESENT INVENTION

The present invention discloses a pipe clamp which is releasably clampable about a pipe. In one embodiment the pipe clamp has a body member with two arms movably connected to it. Preferably, the arms are urged outwardly by springs biased against the arms and the body member. Gripping elements are provided on the arms and on the body member for contacting the pipe and gripping it. A cylinder movably mounted in a channel in the body member is disposed for movement when a lifting force is applied to a lift member movably connected to the cylinder. As the cylinder moves, cam surfaces thereon are forced against rollers movably mounted in plungers, moving the plungers outwardly from the cylinder to contact a portion of the arms thereby forcing the arms toward each other so that a pipe disposed therebetween is held therebetween so it cannot escape from the clamp and/or clamped between the arms. The cylinder's line of movement is generally perpendicular to the plungers' line of movement.

In one aspect the plungers may have an adjustable member (such as a threaded bolt threadedly engaging a threaded bore in a plunger) which is adjustable to adjust the extent of movement of the arms in response to the plunger movement; thus insuring adequate pipe clamping without excessive or damaging force.

In one aspect the cylinder has a recess therein and a spring-loaded pin is mounted on the body member. The pin is urged into the recess by the spring. Pulling on the pin overcomes the spring force and removes the pin from the recess. While the pin is in the recess, the cylinder's movement is restricted, in turn restricting outward movement of the arms so that they cannot move apart a distance sufficient to permit a pipe held between the arms to fall out in the space between the ends of the arms. The recess may also be fashioned to prevent cylinder movement in the other direction so that when the pin abuts the other end of the recess, the arms are prevented from any further movement together, thus insuring that the arms do not clamp the pipe to such an extent that the pipe is damaged or bent.

In certain embodiments gripping elements on the movable arms and on the body member contact at least fifty-percent of the pipe's circumference and most preferably at least sixty percent thereof.

In one embodiment the clamp has one fixed arm and one movable arm. The movable arm is moved as described above by coaction of a cylinder and a plunger. The cylinder moves in a different plane than the plane of movement of the arm (or, in the previously mentioned embodiment, arms).

In certain embodiments, a lift line may be attached directly to the cylinder and the lifting member may be omitted.

It is, therefore, an object of at least certain preferred embodiments of the present invention to provide:

New, useful, unique, efficient, non-obvious pipe clamps;

Such devices which do not damage pipe to be clamped;

Such devices which provide gripping elements for contacting at least fifty percent of a pipe's circumference; and Such devices which provide a positive lock on movement of the arms that grip a pipe so that the pipe does not fall out from between the arms until the locking mechanism is released.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention should be read to include any legally equivalent devices which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this parent's purpose in claiming this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 3 is a side view of part of the mechanism shown in FIG. 1E.

FIG. 4A is a side view of a cylinder shown in FIG. 3. FIG. 4B is a top view of the cylinder of FIG. 4A.

FIG. 5A is a side view of a lift member of the clamp of FIG. 1B. FIG. 5B is a top view of the lift member of FIG. 5A.

FIG. 6A is a side view of an arm clamping element of the clamp of FIG. 1B. FIG. 6B is a top view of the element of FIG. 6A.

FIG. 7A is an end view of a movable plunger of the clamp of FIG. 1B. FIG. 7B is a side view of the plunger of FIG. 7A. FIG. 7C is a view of the end of the plunger of FIG. 7B opposite the end shown in FIG. 7A. FIG. 7D is a side view of the plunger of FIG. 7B.

DESCRIPTION OF EMBODIMENTS PREFERRED AT THE TIME OF FILING FOR THIS PATENT

Figure 1A:
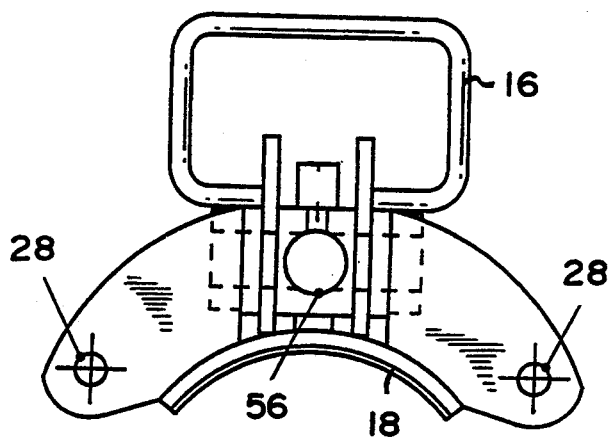
FIG. 1A is a top view of part of a clamp according to the present invention as shown in FIG. 1B.
Figure 1B:
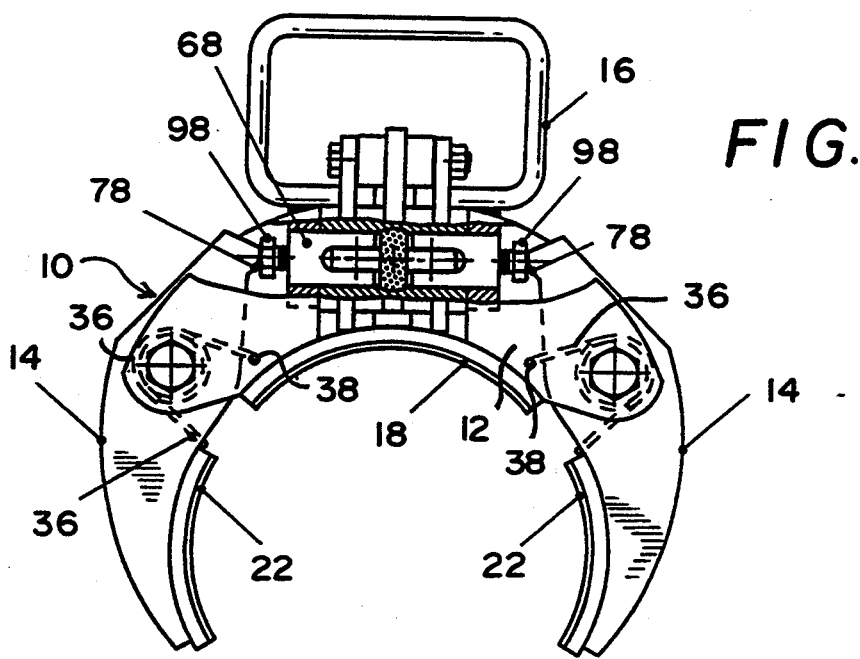
FIG. 1B is a front view of a clamp according to the present invention.
Figure 1C:
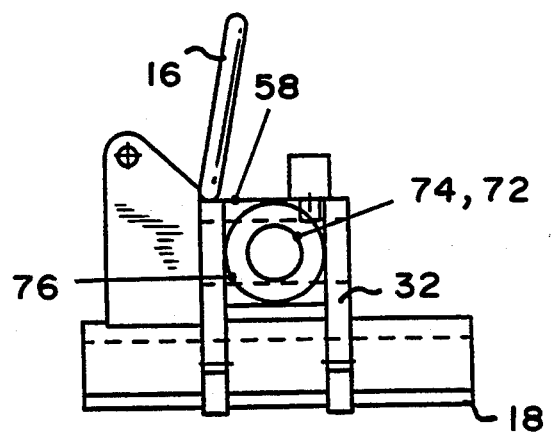
FIG. 1C is a side view of the clamp of FIG. 1A.
Figure 1D:
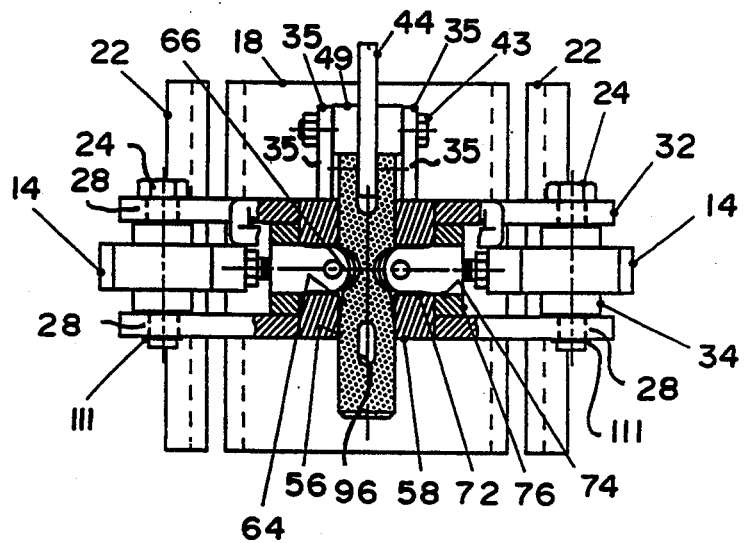
FIG. 1D is a top view in cross-section of the clamp of FIG. 1B.

Referring now to FIGS. 1A–1E, a pipe clamp 10 according to the present invention has a body member 12 to which are movably attached two gripping arms 14. A handle 16 is secured to the body member 12. The body member 12 has a gripping element 18 and the arms 14 each have a gripping element 22 for contacting the pipe and gripping it. Any suitable available gripping element may be used, including but not limited to gripping elements made of elastomers, plastics, metals, metal-backed rubber or elastomer, serrated bodies, or polytetrafluoroethylene. The gripping elements 22 and the gripping element 18 may be secured to, respectively, the arms and the body member by any suitable adhesive or glue, or by any suitable attachments means such as screws, bolts, or interengaging or interfitting structures.

It is preferred that the three gripping elements grip at least fifty percent of a pipe's total circumference and most preferably at least sixty percent or more thereof.

Each arm 14 is pivotably mounted to the body member 12 with a bolt 24 which passes through a bolt hole 26 in an arm spacer (or thrust bearing) 34 and through bolt holes 28 in arm mount plates 32 on the body 12. Retainer clips 111 hold the bolts. A spring 36 is biased against a hole 38 on the body 12 and against each arm 14 to force the arms 14 apart from each other. The arms are initially held apart a sufficient distance so that a pipe to be clamped may be moved into position between the arms.

A lift member 44 is pivotably mounted with a pin 43 that extends through a spacer 49 which is secured to plates 35 on the body 12. A pin 37 extends through holes 48 in the lift member 44 and through a hole 52 in a cylinder 54. The cylinder 54 is movably disposed in a channel 56 in a block 58 secured to the body 12. Upon connection of a lift line or rope (not shown) to a lift hole 62 through the lift member 44, the lift member 44 pivots about the pin 43 and moves outwardly (to the left in FIG. 1E) pulling the cylinder 54 outwardly also. The cylinder 54 has exterior cam surfaces 64 which are forced against rollers 66 of plungers 68 which are movably mounted in plunger channels 72 in the block 58 and plunger channels 74 in the blocks 76 which are secured to the body member 12. As the cam surfaces 64 are forced against the rollers 66 (as the lift member is pivoted outwardly just prior to the commencement of lifting of the pipe), the plungers move apart from each other to contact projections 78 on each of the movable arms, forcing the arms to pivot together against the force of the springs 36 to clamp the pipe. The rollers 66 initially rest in a rest recess 82 in the cylinder 54. It is within the scope of this invention to eliminate the rollers 66, and simply have the cylinder 54 cam the plungers outwardly. It is also within the scope of this invention for only one of the arms to move.

Figure 1E:
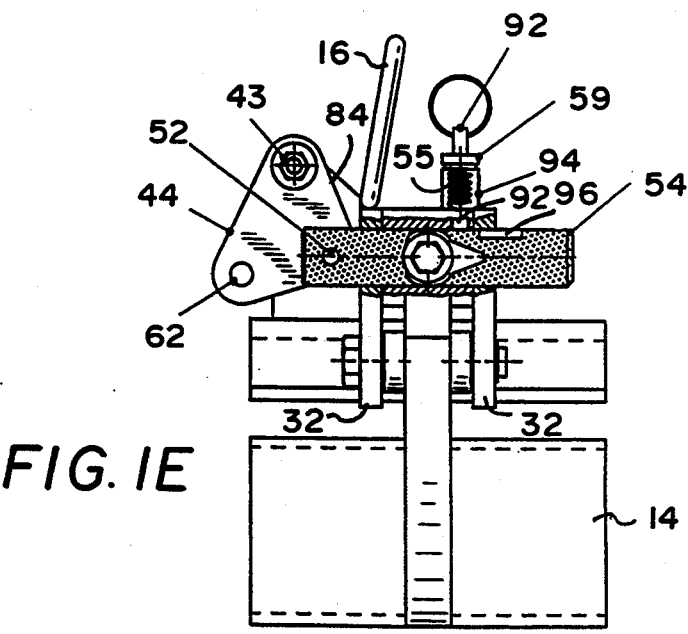
FIG. 1E is a side view in cross-section of part of the clamp of FIG. 1B.
Figure 2A:
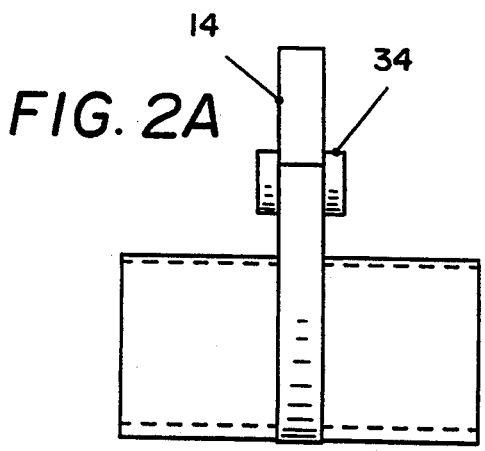
FIG. 2A is a side view of a movable arm of the clamp of FIG. 1B.
Figure 2B:
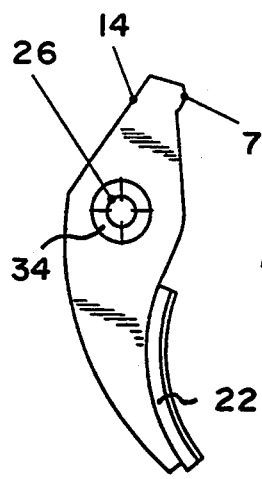
FIG. 2B is a front view of the arm of FIG. 2A.

The extent of travel of the cylinder 54 is limited by contact of a side 84 of the lift member 44 with an end 86 of a recess 88 in the cylinder 54. The lift member 44 is movable within the recess 88. The extent of travel of the cylinder 54 is also limited by a spring-loaded pin 92 which is secured with a nut 59 in a pin holder 94 secured to the body member 12. The pin 92 has an end that projects into a recess 96 in the cylinder 54. The pin abutting either end of the recess 96 stops the cylinder's movement. When the pin 92 abuts the end of the recess 96 farthest from the handle 16, the cylinder's movement to cam the plungers outwardly is stopped; i.e. the arms are prevented from applying any further increased clamping force to a pipe. Abutment of the plungers against an edge of the recess 82 may also achieve this. When the pin 92 abuts the end of the recess 96 closest to the handle 16, the movement of the cylinder 54 permitting the arms 14 to release from the pipe is prevented so that although the arms may release somewhat from the pipe, they will not spread apart a distance sufficient to allow the pipe to pass between the arms. To release the clamp, the pin 92 is pulled out so that the cylinder 54 is free to move, allowing the arms 14 to expand outwardly under the force of the springs 36. As shown in FIG. 1E, the pin 92 is initially against the surface of the cylinder 54, but once the recess 96 aligns with the pin 92, the spring 55 urges the pin downwardly into the recess 96. Thus, when a lifting force is applied to the lifting member 44 and the arms 14 are moved sufficiently to enclose the pipe, the pin 92 entering into the recess 96 prevents unwanted escape of the pipe from the clamp.

A rotatable bolt 98 threadedly engages a threaded bore 97 in each plunger 68. These bolts provide adjustment to adjust the total plunger length to effectively adjust the extent of movement of the arms 14 to clamp the pipe.

In conclusion, therefore, it is seen that the present invention and the embodiments disclosed herein and those covered by the appended claims are well adapted to carry out the objectives and obtain the ends set forth. Certain changes can be made in the subject matter described, shown and claimed without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A pipe clamp comprising
a body member
at least one clamping arm pivotably mounted to the body member,
moving means for moving the arm to clamp a pipe, the moving means comprising
a cylinder movably mounted in a cylinder channel in the body member, the cylinder moving in a plane different from a plane in which the at least one arm moves,
at least one plunger movably mounted in a plunger channel in the body member and movable with respect to the body member and to the cylinder, the moving means effecting movement of the cylinder in response to a lifting force on the moving means, the cylinder moving to contact and move the at least one plunger, the plunger moving to contact the clamping arm to move it to clamp the pipe.

2. A pipe clamp comprising
a body member,
two opposed clamping arms, each pivotably mounted to the body member, and
moving means for moving the arms to clamp a pipe, the moving means moving in a plane different from a plane of movement of the arms, the moving means movable to move the arms to move them toward each other to contact and clamp the pipe therebetween, the moving means comprising a cylinder movably mounted in a cylinder channel in the body member, two plungers, one corresponding to each arm, each plunger movably mounted in a plunger channel in the body member and movable with respect to the body member and with respect to the cylinder, and the cylinder movable in response to a lifting force on the moving means to contact the plungers and force them outwardly from the body member so that the plungers contact the arms and move the arms together to clamp the pipe.

3. The pipe clamp of claim 2 further comprising
releasable locking means for inhibiting movement of the cylinder so that the arms do not move apart to release the pipe held by the pipe clamp.

4. The pipe clamp of claim 3 Wherein the releasable locking means comprises
a cylinder recess in the cylinder, and
a spring-loaded pin extending through the body member and movable into the cylinder recess upon movement of the cylinder which results in clamping of the pipe, disposition of the pin in the recess inhibiting cylinder movement.

5. The pipe clamp of claim 4 wherein disposition of the pin in the recess also inhibits clamping of the pipe with such a force that would damage the pipe.

6. The pipe clamp of claim 2 comprising also
gripping elements on the body member and on each arm for gripping the pipe.

7. The pipe clamp of claim 6 wherein the gripping elements together contact at least fifty-percent of a circumference of the pipe.

8. The pipe clamp of claim 2 further comprising
length adjustment means on each plunger for changing the effective length of each plunger to thereby change the extent of arm movement.

9. The pipe clamp of claim 8 wherein the length adjustment means comprises a bolt threadedly engaged in and movable with respect to a threaded bore in each plunger.

10. The pipe clamp of claim 2 further comprising
the cylinder having cam surfaces thereon for forcing the plungers outwardly, and
each plunger having a movable cam follower thereon for contact by the cam surfaces of the cylinder.

11. The pipe clamp of claim 2 comprising also
two springs, each of which is biased against one of the arms and the body member to force the arms apart.

12. The pipe clamp of claim 2 comprising also
a lift member pivotably attached to the body member and to the moving means so that application of a lifting force to the lift member effects movement of the moving means to move the arms to clamp the pipe.

13. A pipe clamp comprising
a body member
two opposed clamping arms, each pivotably mounted to the body member, and
moving means for moving the arms to clamp a pipe, the moving means moving in a plane different from a plane of movement of the arms, the moving means movable to move the arms toward each other to contact and clamp the pipe therebetween, the moving means comprising a cylinder movably mounted in a cylinder channel in the body member, two plungers, one corresponding to each arm, each plunger movably mounted in a plunger channel in the body member and movable with respect to the body member and with respect to the cylinder, the cylinder movable in response to a lifting force on the moving means to contact the plungers and force them outwardly from the body member so that the plungers contact the arms and move the arms together to clamp the pipe,
releasable locking means on the body member for inhibiting movement of the cylinder so that the arms do not move apart to release a pipe held by the pipe clamp, the releasable locking means comprising a cylinder recess in the cylinder, a spring-loaded pin extending through the body member and movable into the cylinder recess upon movement of the cylinder resulting in clamping of the pipe so that disposition of the pin in the recess inhibits cylinder movement.

* * * * *